(12) United States Patent  
Xie et al.

(10) Patent No.: US 7,084,985 B2
(45) Date of Patent: Aug. 1, 2006

(54) HIGH-RESOLUTION OPTICAL SPECTRUM ANALYZER

(75) Inventors: Tong Xie, San Jose, CA (US); Douglas M. Baney, Los Altos, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 318 days.

(21) Appl. No.: 10/420,449

(22) Filed: Apr. 22, 2003

(65) Prior Publication Data

US 2004/0212806 A1  Oct. 28, 2004

(51) Int. Cl.
*G01B 9/02* (2006.01)
*G01J 3/45* (2006.01)

(52) U.S. Cl. ..................................... 356/454; 356/519

(58) Field of Classification Search ................ 356/454, 356/519; 359/577, 578, 589
See application file for complete search history.

(56) References Cited

U.S. PATENT DOCUMENTS

| | | | | |
|---|---|---|---|---|
| 3,914,055 A * | 10/1975 | Wolga et al. | ............... | 356/454 |
| 5,218,422 A * | 6/1993 | Zoechbauer | ................ | 356/454 |
| 5,357,340 A * | 10/1994 | Zochbauer | ................. | 356/454 |
| 5,930,045 A | 7/1999 | Shirasaki | .................... | 359/577 |
| 5,969,865 A | 10/1999 | Shirasaki | .................... | 359/577 |
| 5,969,866 A | 10/1999 | Shirasaki | .................... | 359/577 |
| 5,973,838 A | 10/1999 | Shirasaki | .................... | 359/577 |
| 5,999,320 A | 12/1999 | Shirasaki | .................... | 359/577 |
| 6,028,706 A | 2/2000 | Shirasaki et al. | .......... | 359/577 |
| 6,144,494 A | 11/2000 | Shirasaki et al. | .......... | 359/578 |
| 6,504,616 B1 * | 1/2003 | Haber et al. | ................ | 356/519 |
| 6,608,721 B1 * | 8/2003 | Turpin et al. | ............... | 359/577 |
| 6,806,965 B1 * | 10/2004 | Deck | .......................... | 356/512 |
| 2002/0105705 A1 | 8/2002 | Turpin et al. | ............... | 359/173 |
| 2002/0154662 A1 | 10/2002 | Turpin et al. | ................ | 372/20 |
| 2003/0021525 A1 | 1/2003 | Turpin et al. | ................ | 385/24 |

* cited by examiner

*Primary Examiner*—Hoa Q. Pham
*Assistant Examiner*—Michael A. Lyons

(57) ABSTRACT

An optical spectrum analyzer apparatus for analyzing the spectral content of a light signal. The optical spectrum analyzer apparatus includes an optical tapped delay line (OTDL) unit as a light dispersing unit to provide an analyzer apparatus having increased resolution.

18 Claims, 3 Drawing Sheets

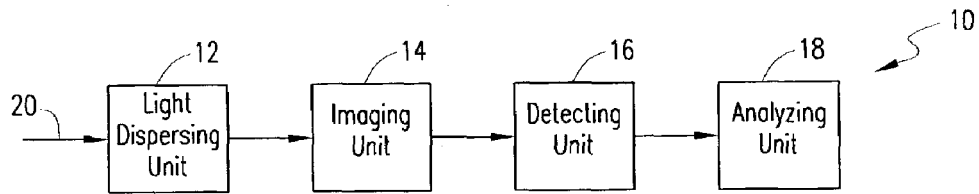
FIG. 1
(PRIOR ART)
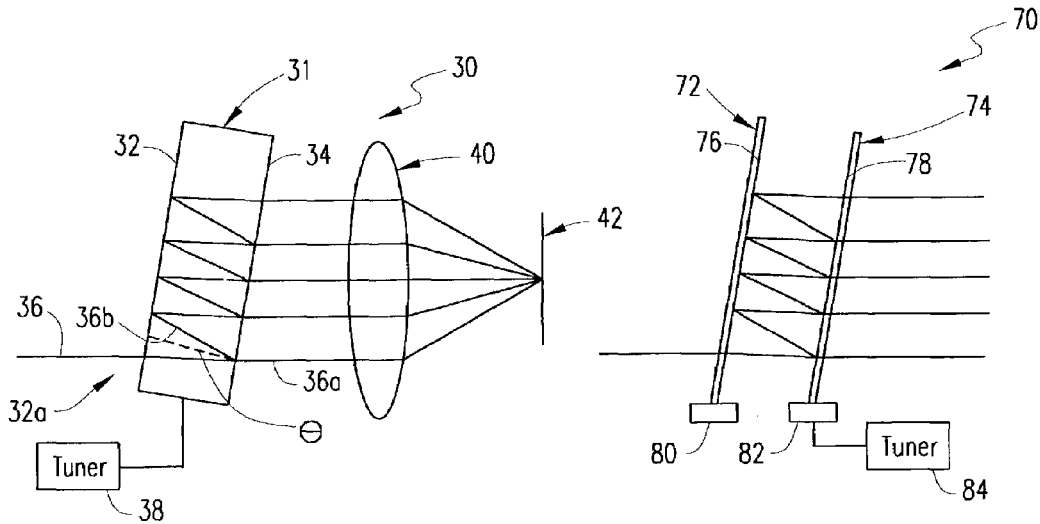
FIG. 2
FIG. 4
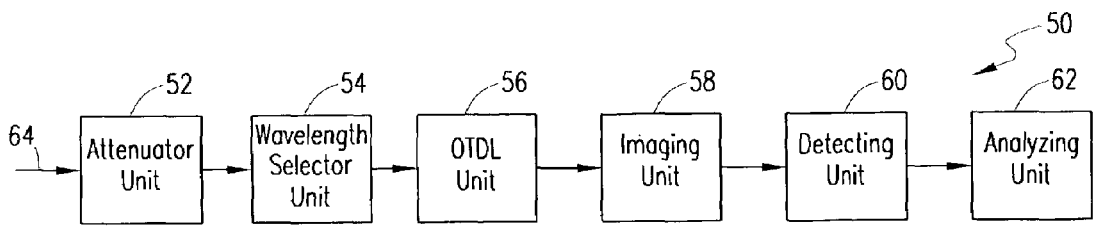
FIG. 3

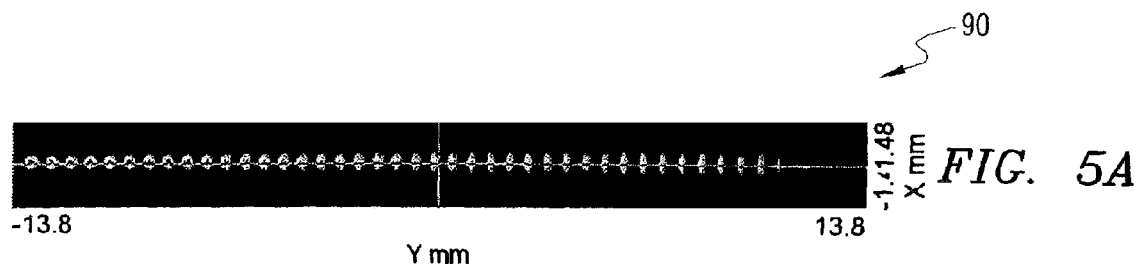
FIG. 5A
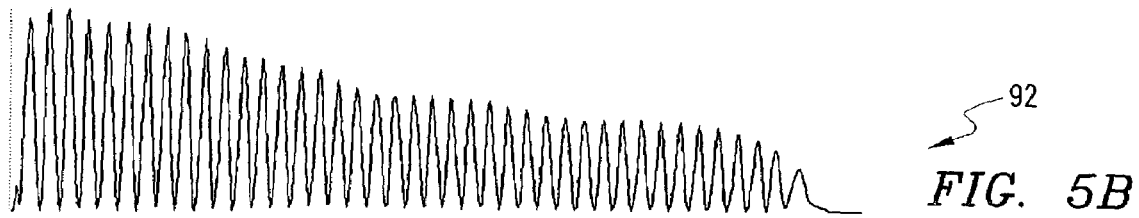
FIG. 5B
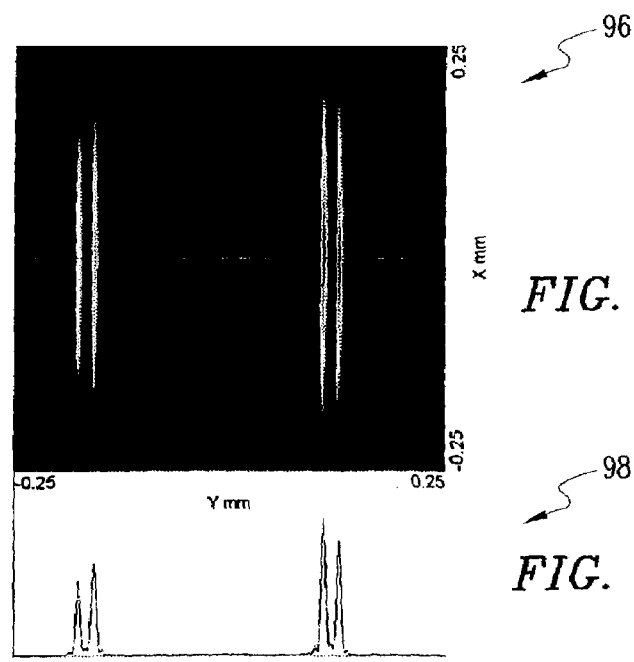
FIG. 6A
FIG. 6B

HIGH-RESOLUTION OPTICAL SPECTRUM ANALYZER

BACKGROUND OF THE INVENTION

1. Technical Field of the Invention

The present invention relates generally to the field of optical spectrum analyzers; and more particularly, to an optical spectrum analyzer apparatus that includes an optical tapped delay line (OTDL) unit for separating input light into component wavelengths, and to a method for analyzing the spectral content of a light signal.

2. Description of Related Art

An optical tapped delay line (OTDL) is a passive optical device that can be used to convert a single optical beam into a plurality of identical, spatially distinct beams at uniform time delays. An important characteristic of an OTDL is the capability of presenting a long optical path within a small space and to permit a controlled tapping off of energy from an optical beam at uniform intervals to provide the plurality of spatially distinct beams.

OTDLs have been used in optical communications systems, such as Wavelength Division Multiplexing (WDM) or Dense Wavelength Division Multiplexing (DWDM) systems, to increase the transmission capacity of the systems. In particular, by modulating each of the plurality of spatially distinct beams formed by the OTDL with a different information signal, and then recombining the modulated beams, the plurality of information signals can be simultaneously transmitted through a single optical fiber or other wave guiding device of the optical communications system.

It is also known to utilize a virtually imaged phase array (VIPA) in optical communications systems. A VIPA is a device that is capable of receiving input light focused on a front surface thereof and having a wavelength within a continuous range of wavelengths, and producing output light that is spatially distinguishable in accordance with the wavelength of the input light. VIPA devices have been used in optical communications systems to compensate for chromatic dispersion, as a wavelength demultiplexer and in other applications.

In order to ensure the proper design and operation of an optical communications system such as a WDM system, it is necessary to analyze the spectral content of light signals transmitted through a wave guiding device of the system. This is typically accomplished using an optical spectrum analyzer (OSA). Ever improving optical communications systems, however, require an optical spectrum analyzer that has a spectral resolution higher than that provided by conventional optical spectrum analyzers.

There is, accordingly, a need for an optical spectrum analyzer apparatus having improved spectral resolution for use in optical communications systems and in other applications.

SUMMARY OF THE INVENTION

The present invention provides an optical spectrum analyzer apparatus having improved spectral resolution for use in optical communications systems, such as WDM systems, and in other applications.

An optical spectrum analyzer apparatus according to the present invention comprises an optical tapped delay line (OTDL) unit for receiving input light and for providing output light, the output light comprising the input light separated into component wavelengths, an imaging unit for producing an image of the output light wherein spatial characteristics of the image represent spectral properties of the input light, and an analyzing unit for analyzing the image to provide information regarding the spectral properties of the input light.

It has been discovered that by utilizing an OTDL unit as a light dispersing unit in an optical spectrum analyzer apparatus, an OSA apparatus having increased spectral resolution, in the picometer range, can be provided. The OSA apparatus can be used to analyze light in an optical communications system such as a WDM system and in many other applications where increased resolution is needed or desired.

Furthermore, the invention provides embodiments with other features and advantages in addition to or in lieu of those discussed above. Many of the features and advantages are apparent from the description below with reference to the following drawings.

BRIEF DESCRIPTION OF THE DRAWINGS

FIG. 1 is a block diagram that schematically illustrates an optical spectrum analyzer apparatus to assist in explaining the present invention;

FIG. 2 is a diagram that schematically illustrates the operation of an optical spectrum analyzer apparatus including an optical tapped delay line unit as a light dispersing unit according to an exemplary embodiment of the present invention;

FIG. 3 is a block diagram that schematically illustrates an optical spectrum analyzer apparatus according to another exemplary embodiment of the present invention;

FIG. 4 is a diagram that schematically illustrates a tunable optical tapped delay line unit according to another exemplary embodiment of the invention;

FIGS. 5A and 5B are optical models that schematically illustrate an image produced by the optical tapped delay line unit of the optical spectrum analyzer apparatus of FIG. 3, and the power content of the image, respectively;

FIGS. 6A and 6B are optical models that schematically illustrate an image output from the detecting unit of the optical spectrum analyzer apparatus of FIG. 3, and the spectral lines representing the image, respectively.

DETAILED DESCRIPTION OF THE EXEMPLARY EMBODIMENTS OF THE INVENTION

Figure 7:
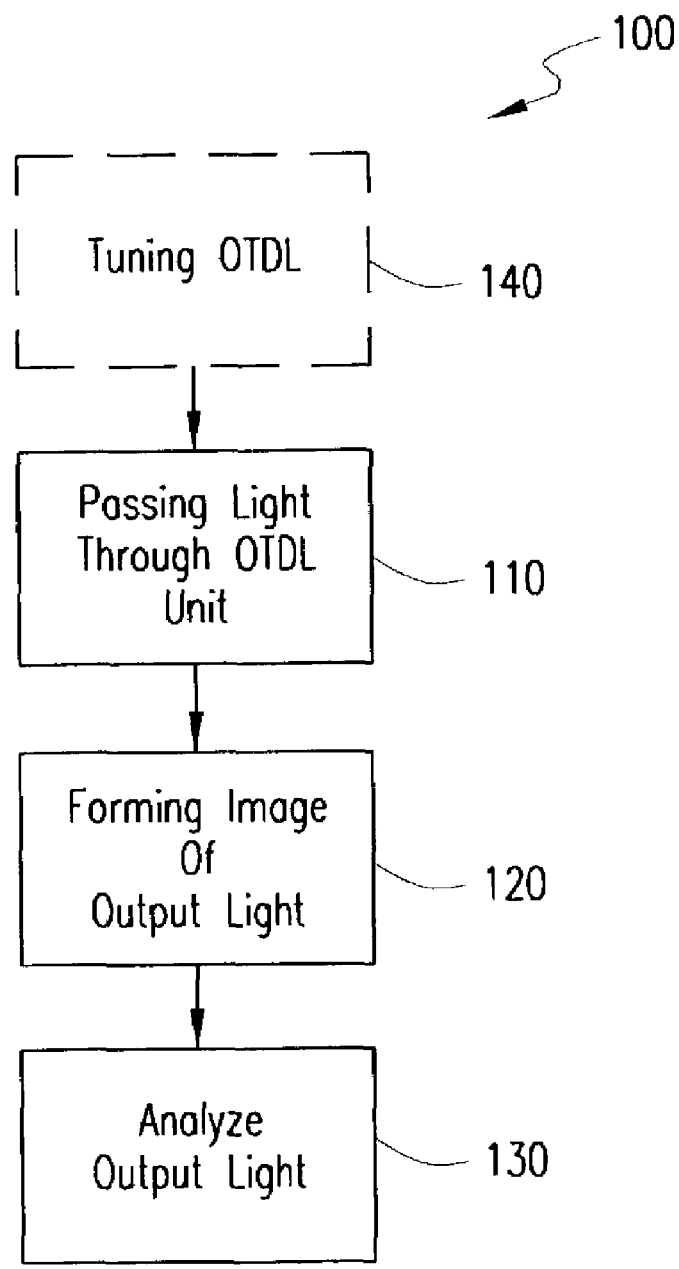
FIG. 7 is a flow chart that illustrates steps of a method for analyzing the spectral content of a light signal according to another exemplary embodiment of the present invention.

FIG. 1 is a block diagram that schematically illustrates an optical spectrum analyzer (OSA) apparatus to assist in explaining the present invention. The OSA apparatus is generally designated by reference number 10, and includes light dispersing unit 12, imaging unit 14, detecting unit 16 and analyzing unit 18.

Light dispersing unit 12 receives input light 20, for example, light that has been transmitted through an optical fiber in an optical communications system, such as a WDM optical communications system, and separates the input light into its component wavelengths. In a typical OSA apparatus, light dispersing unit 12 comprises a prism or a grating. Imaging unit 14 comprises an optical imaging system that receives light from light dispersing unit 12 and provides an image of the light on an imaging plane. Detecting unit 16 detects the image provided by the imaging unit, and analyzing unit 18 analyzes the image to provide information regarding the spectral content of input light 20.

As indicated above, known grating-based OSA apparatus often do not provide the resolution that is required for many applications such as, for example, to analyze signals in a WDM or DWDM optical communications system.

FIG. 2 is a diagram that that schematically illustrates the operation of an optical spectrum analyzer apparatus including an optical tapped delay line unit as a light dispersing unit according to an exemplary embodiment of the present invention The OTDL unit is generally designated by reference number 30 and comprises a transparent block 31 having surfaces 32 and 34 that are parallel to one another and that are oriented at an angle with respect to input light beam 36 impinging thereon. Surface 32 includes a transparent portion 32a that functions as an input window for input light beam 36, while the remainder of the surface is completely reflective. Accordingly, input light beam 36 is transmitted through portion 32a of surface 32 and impinges on surface 34. A first portion of the input light beam is transmitted through surface 34, as shown at 36a, and a second portion of the light beam is reflected from surface 34, as shown at 36b. First portion 36a travels to imaging unit 40, represented as a lens, and second portion 36b is reflected off of surface 34 toward surface 32.

Second portion 36b of the light beam is substantially fully reflected off of surface 32 and returns to surface 34, where, again, a first portion of the light beam is transmitted through surface 34 and a second portion of the light beam is reflected off of surface 34 back to surface 32. As shown in FIG. 2, the light continues to travel back and forth between surfaces 32 and 34, and each time the light impinges on surface 34, a portion of the light beam is transmitted through surface 34 resulting in a plurality of "tapped" first light beam portions being transmitted through surface 34.

The plurality of tapped light beam portions each have a different amount of phase delay, and interfere with each other to produce output light having spatial characteristics defined by the spectral content of the input light. For a tilt angle θ (see FIG. 2) of the OTDL device, the light dispersion of the device can be represented as:

$$\frac{d\theta}{d\lambda} \cong \frac{1}{\lambda \tan \theta}$$

where λ is the wavelength of the input light. The output light is imaged onto an image plane of detecting unit 42 by imaging unit 40, and the detected image is analyzed by an analyzing unit to provide information about the spectral content of input light 36.

The resolution of an OSA apparatus including an OTDL unit 30 as a light dispersing unit is proportional to the number of reflections between surfaces 32 and 34 of the OTDL unit, i.e., the number of tapped light beam portions transmitted through surface 34. The greater the number of reflections, the higher the resolution, and the resolution can be increased by increasing the length of the OTDL unit.

The line width of the OTDL unit is equal to:

$$\frac{c\sqrt{n^2 - n_0^2 \sin^2 \theta}}{2Nn^2 t}$$

where c is the speed of light, N is the number of reflections, n is the index of refraction of the OTDL device, $n_0$ is the index of refraction of the surrounding medium, t is the thickness of the OTDL device and θ is the tilt angle of the OTDL device.

It is to be recognized, however, that a portion of input light 36 will be lost each time a portion of the input light is transmitted through surface 34; and this will place a limit on the resolution that is attainable. As will be described hereinafter, however, with an OSA apparatus including an OTDL unit as a light dispersing unit according to an exemplary embodiment of the present invention, a resolution in the picometer range is achievable.

The optical path delay between adjacent output beam portions 36a determines the bandwidth of the OSA apparatus, and is a function of the thickness of the OTDL unit (i.e., the spacing between surfaces 32 and 34) and/or the index of refraction of the OTDL unit. In an exemplary embodiment of the present invention, an OTDL unit made of fused silica with a refractive index of 1.44 and a thickness of 6.25 mm has a bandwidth of 16.6 GHz wherein bandwidth is defined as:

$$\frac{c\sqrt{n^2 - n_0^2 \sin^2 \theta}}{2n^2 t}$$

where c is the speed of light, n is the index of refraction of the OTDL device, $n_0$ is the index of refraction of the surrounding medium, t is the thickness of the OTDL device, and θ is the angle of tilt of the OTDL device.

FIG. 3 is a block diagram that schematically illustrates an optical spectrum analyzer apparatus according to an exemplary embodiment of the present invention. The apparatus is generally designated by reference number 50 and includes optical attenuator unit 52, coarse wavelength selector unit 54, OTDL unit 56, imaging unit 58, detecting unit 60 and analyzing unit 62.

Optical attenuator unit 52 controls the power of input light 64 in order to limit distortion. The attenuated light then passes to coarse wavelength selector unit 54 that has a bandwidth equal to or smaller than the bandwidth of OTDL unit 56, and is utilized to eliminate unwanted wavelengths from passing to the OTDL unit. Coarse wavelength selector unit 54, in effect, functions as a filter to suppress noise so that a clean signal is passed to OTDL unit 56. The light output from OTDL unit 56 is imaged onto detecting unit 60 by imaging unit 58 and the detected image is analyzed by analyzing unit 62.

In exemplary embodiments of the present invention, detecting unit 60 can comprise a photographic plate or an electronic camera. In another exemplary embodiment, detecting unit 60 can comprise a detector array at the Fourier plane of optical imaging unit 58. The utilization of a detector array enables fast spectrum analysis without scanning.

According to a further exemplary embodiment of the present invention, OTDL unit 56 can comprise a tunable OTDL unit to permit the bandwidth of the OTDL unit to be adjusted. FIG. 4 is a diagram that schematically illustrates a tunable OTDL unit according to a further exemplary embodiment of the present invention. As shown in FIG. 4, tunable OTDL unit 70 comprises first and second plates 72 and 74 supported on first and second support members 80 and 82 to be parallel to one another. Plate 72 includes surface 76 (corresponding to surface 32 in FIG. 2) that reflects light impinging on it, and plate 74 includes surface 78 (corresponding to surface 34 in FIG. 2) that both transmits and reflects light. At least one of the support members 80 and 82 is movable, and a tuner 84 is connected to the movable support member to control the spacing between the first and second support members. Controlling the spacing between first and second support members also controls the spacing between first and second plates 72 and 74, and, hence, the spacing between surfaces 76 and 78. Thus, the bandwidth of OTDL unit 70 can be controlled by controlling the spacing between plates 72 and 74.

In yet another exemplary embodiment of the present invention, the bandwidth of an OTDL unit can be controlled by controlling the index of refraction of the transparent material disposed between surfaces 32 and 34 in FIG. 2 or surfaces 76 and 78 in FIG. 4. In FIG. 2, for example, the index of refraction of transparent block 31 can be adjusted in any appropriate manner, for example, via electro or thermal effects as indicated by tuner 38. In one exemplary embodiment, transparent block 31 can comprise a block of liquid crystal material, and the index of refraction can be controlled by controlling a voltage applied across the block. In such an embodiment, because a liquid crystal material exhibits polarization diversity, input light 36 is preferably separated into different polarizations and then combined after passing through block 31.

FIGS. 5A and 5B are optical models that schematically illustrate an image produced by the OTDL of the optical spectrum analyzer apparatus of FIG. 3, and the power content of the image, respectively. Image 90 illustrated in FIG. 5A comprises a series of spots or "footprints" of the beams on surface 34 or 78 of OTDL unit 30 or 70. The footprints represent the number of "bounces" (number of light beams transmitted through surface 34 or 78 or the number of interfering beams. As shown in FIG. 5A, the footprints representing the light beams that are first transmitted through the OTDL unit (the footprints toward the left side of FIG. 5A) are relatively sharp and well-defined. As the number of transmissions through surface 34 or 78 increases, however, the footprints gradually become less distinct and lose their shape. As discussed above, this is, in part, due to the fact that the transmitted light becomes weaker and loses intensity as the number of transmissions through the OTDL unit increase; and, also, because the beams gradually diverge as the number of transmissions increases.

FIG. 5B is a graph 92 that demonstrates the power content of the spots in image 90 of FIG. 5A. As is apparent, the intensity is strongest towards the left of FIG. 5B and gradually decreases toward the right of FIG. 5B as the number of transmissions increase.

In an exemplary embodiment of the present invention, the intensity of the light output from the OTDL can be controlled by designing a particular coating function for surface 34 or 78. For example, special coating designs for surface 34 or 78, or apodization of the outputs will help to achieve a uniform intensity among all orders of the output beams Also, this intensity distribution envelope function directly affects the filter function of the device through the Fourier transform. By altering the intensity distribution envelope function by proper design of the coating, a particular filter function can be achieved.

FIGS. 6A and 6B are optical models that schematically illustrate an image output from detecting unit 60 of the optical spectrum analyzer apparatus of FIG. 3. FIG. 6A illustrates the image 96 and FIG. 6B is a graphical representation 98 of the spectral lines representing the image. The resulting spectrum provides a unique signature of the frequencies present in the output light. The image represents spectral lines of two different wavelengths separated by 1 GHz.

FIG. 7 is a flow chart that illustrates steps of a method for analyzing the spectral content of light according to another exemplary embodiment of the present invention. The method is generally designated by reference number 100 and may begin by passing input light to be analyzed through an optical tapped delay line unit (step 110). An image of the light passed through the OTDL unit is then formed (step 120) and the image is analyzed by an analyzing unit to provide information regarding the spectral content of the input light (step 130). As also shown in FIG. 7, if the OTDL is a tunable OTDL, the bandwidth thereof can be tuned, if desired, before the input light is passed therethrough as shown in dotted line as step 140.

While what has been described constitute exemplary embodiments of the present invention, it should be recognized that the invention can be varied in many ways without departing therefrom. Accordingly, it should be understood that the invention should be limited only insofar as is required by the scope of the following claims.

We claim:

1. An optical spectrum analyzer apparatus, comprising:
   an optical tapped delay line unit for receiving input light and for providing output light, said output light comprising said input light separated into component wavelengths;
   an imaging unit for producing an image of said output light wherein spatial characteristics of said image represent spectral properties of said input light; and
   an analyzing unit for analyzing the image to provide information regarding the spectral properties of said input light.

2. The apparatus according to claim 1, wherein said optical tapped delay line unit includes first and second surfaces, said first surface transmitting a first portion of light impinging thereon as a portion of said output light and reflecting a second portion of light impinging thereon toward said second surface, and said second surface reflecting light impinging thereon back to said first surface.

3. The apparatus according to claim 2, wherein said first and second surfaces are parallel.

4. The apparatus according to claim 2, wherein said first and said second surfaces comprise surfaces on a transparent block.

5. The apparatus according to claim 2, wherein said first and second surfaces comprise surfaces on first and second plates, respectively.

6. The apparatus according to claim 2, and further including means for adjusting a bandwidth of said optical tapped delay line unit.

7. The apparatus according to claim 6, wherein said means for adjusting a bandwidth of said optical tapped delay line unit comprises means for adjusting a spacing between said first and second surfaces.

8. The apparatus according to claim 7, wherein said first and second surfaces comprise surfaces on first and second plates, respectively, and wherein said means for adjusting a spacing between said first and second surfaces comprises means for adjusting a spacing between said first and second plates.

9. The apparatus according to claim 6, wherein said means for adjusting a bandwidth of said optical tapped delay line unit comprises means for controlling an index of refraction of said optical tapped delay line unit.

10. The apparatus according to claim 9, wherein said means for controlling an index of refraction of said optical tapped delay line unit controls the index of refraction via electro or thermal effects.

11. The apparatus according to claim 1, further comprising an attenuator for controlling power of said input light.

12. The apparatus according to claim 1, further comprising a course wavelength selector for suppressing noise from said input light.

13. A method for analyzing spectral content of a light signal, comprising:

passing a light signal to be analyzed through an optical tapped delay line unit;

forming an image of the light passed through the optical lapped delay line unit; and analyzing said image to provide information regarding the spectral content of said light signal.

14. The method according to claim 13, wherein said optical tapped delay line unit includes first and second parallel surfaces, said first surface transmitting a first portion of light impinging thereon and reflecting a second portion of light impinging thereon toward said second surface, and said second surface reflecting the light impinging thereon back to said first surface, and wherein said method further includes adjusting a spacing between said first and second surfaces for adjusting a bandwidth of said optical tapped delay line unit.

15. The method according to claim 13, further including attenuating said light signal prior to passing said light signal through said optical tapped delay line unit.

16. The method according to claim 13, further including filtering said light signal prior to passing said light signal through said optical tapped delay line unit.

17. The method according to claim 13, wherein said optical tapped delay line unit comprises a transparent block, and wherein said method further includes adjusting index of refraction of said transparent block for adjusting a bandwidth of the optical tapped delay line unit.

18. The method according to claim 17, wherein said adjusting index of refraction of said transparent block comprises adjusting a voltage applied across the block.

* * * * *

UNITED STATES PATENT AND TRADEMARK OFFICE
CERTIFICATE OF CORRECTION

| | |
|---|---|
| PATENT NO. | : 7,084,985 B2 |
| APPLICATION NO. | : 10/420449 |
| DATED | : August 1, 2006 |
| INVENTOR(S) | : Xie et al. |

It is certified that error appears in the above-identified patent and that said Letters Patent is hereby corrected as shown below:

In column 7, line 8, in Claim 12, delete "course" and insert -- coarse --, therefor.

Signed and Sealed this

Thirteenth Day of May, 2008

JON W. DUDAS
*Director of the United States Patent and Trademark Office*